(12) United States Patent
Jung et al.

(10) Patent No.: US 8,390,167 B2
(45) Date of Patent: Mar. 5, 2013

(54) MOTOR FOR COMPRESSOR AND HERMETIC COMPRESSOR HAVING THE SAME

(75) Inventors: Hae-Ok Jung, Gyeongsangnam-Do (KR); Seong-Hun Seo, Gyeongsangnam-Do (KR); Sang-Il Choi, Gyeongsangnam-Do (KR); Chul-Hyun Nam, Gyeongsangnam-Do (KR); Ki-Seok Sung, Gyeongsangnam-Do (KR)

(73) Assignee: LG Electronics Inc., Seoul (KR)

( * ) Notice: Subject to any disclaimer, the term of this patent is extended or adjusted under 35 U.S.C. 154(b) by 208 days.

(21) Appl. No.: 12/743,917

(22) PCT Filed: Oct. 20, 2008

(86) PCT No.: PCT/KR2008/006202
§ 371 (c)(1),
(2), (4) Date: Dec. 22, 2010

(87) PCT Pub. No.: WO2009/066874
PCT Pub. Date: May 28, 2009

(65) Prior Publication Data
US 2011/0085926 A1    Apr. 14, 2011

(30) Foreign Application Priority Data

Nov. 22, 2007  (KR) .................. 10-2007-0119901
Nov. 26, 2007  (KR) .................. 10-2007-0121058
Nov. 26, 2007  (KR) .................. 10-2007-0121073
Nov. 28, 2007  (KR) .................. 10-2007-0122310

(51) Int. Cl.
*H02K 1/12*  (2006.01)

(52) U.S. Cl. .................. 310/254.1; 310/216.069
(58) Field of Classification Search .......... 310/216.069–216.073, 254.1, 260
See application file for complete search history.

(56) References Cited

U.S. PATENT DOCUMENTS
(Continued)

FOREIGN PATENT DOCUMENTS
JP    6-38422      2/1994
JP    2004-173366  6/2004
(Continued)

OTHER PUBLICATIONS

International Search Report and Written Opinion dated Sep. 14, 2010 (Application No. PCT/KR 2008/006202).

(Continued)

*Primary Examiner* — Thanh Lam
(74) *Attorney, Agent, or Firm* — Ked & Associates LLP

(57) ABSTRACT

Disclosed are a motor for a compressor and a hermetic compressor having the same. An aluminum coil cheaper than a copper coil is used in the motor for the compressor, to thusly reduce a fabricating cost. Also, a ratio of a height of end coil of a coil to an inner diameter of a stator is appropriately designed or a ratio of an entire area of slot portions to the inner diameter of the stator is appropriately designed, and simultaneously a ratio of the inner diameter of the stator to a width of the tooth portion is appropriately designed, so as to previously prevent a deterioration of damping effect, increase in noise, lowering of efficiency, reduction of driven torque, all caused due to the use of the aluminum coil.

21 Claims, 5 Drawing Sheets

U.S. PATENT DOCUMENTS

| | | | |
|---|---|---|---|
| 3,209,992 A | | 10/1965 | Christiansen |
| 3,942,055 A | * | 3/1976 | Hoffmeyer ............. 310/216.111 |
| 4,241,274 A | * | 12/1980 | Brammerlo ............ 310/216.071 |
| 6,544,009 B2 | * | 4/2003 | Makino et al. ................. 417/312 |
| 6,882,080 B2 | * | 4/2005 | Tanaka et al. ........... 310/216.112 |
| 6,930,424 B2 | * | 8/2005 | Even et al. .................... 310/201 |
| 7,081,697 B2 | * | 7/2006 | Neet ....................... 310/216.011 |
| 7,868,509 B2 | * | 1/2011 | Yoshino et al. ........ 310/216.055 |
| 8,222,788 B2 | * | 7/2012 | Rose ............................. 310/195 |
| 2004/0119363 A1 | * | 6/2004 | Tanaka et al. ................. 310/214 |
| 2007/0210668 A1 | * | 9/2007 | Yoshino et al. ............... 310/216 |
| 2008/0012438 A1 | | 1/2008 | Hong |
| 2008/0129132 A1 | | 6/2008 | Gwon |
| 2008/0170952 A1 | | 7/2008 | Jung |
| 2009/0214363 A1 | | 8/2009 | Noh et al. |
| 2010/0117477 A1 | | 5/2010 | Yoshino et al. |
| 2010/0135830 A1 | * | 6/2010 | Yasuda et al. .............. 417/410.1 |
| 2010/0247347 A1 | | 9/2010 | Yoshino et al. |
| 2010/0295390 A1 | * | 11/2010 | Rau et al. ........................ 310/62 |
| 2010/0329906 A1 | | 12/2010 | Jung et al. |
| 2010/0329907 A1 | | 12/2010 | Jung et al. |
| 2011/0050024 A1 | | 3/2011 | Rose |
| 2011/0081263 A1 | | 4/2011 | Yoshino et al. |

FOREIGN PATENT DOCUMENTS

| | | |
|---|---|---|
| JP | 2005-264749 | 9/2005 |
| KR | 10-0698218 | 3/2007 |

OTHER PUBLICATIONS

Chinese Office Action dated May 8, 2012. (200880120572.6).
International Search Report and Written Opinion dated Sep. 14, 2010 (Application No. PCT/KR 2008/006201).
International Search Report and Written Opinion dated Sep. 14, 2010 (Application No. PCT/KR 2008/006203).
U.S. Office Action issued in U.S. Appl. No. 12/743,936 dated Oct. 23, 2012.
U.S. Office Action issued in U.S. Appl. No. 12/743,906 dated Nov. 7, 2012.

* cited by examiner

|  | TEST 1 | TEST 2 | TEST 3 |
|---|---|---|---|
| INNER DIAMETER OF STATOR (D) | 53 | 55 | 57 |
| WIDTH OF TOOTH PORTION (B) | 3.80 | 3.80 | 3.80 |
| RATIO (D/B) | 13.9 | 14.5 | 15.0 |
| DRIVEN TORQUE (kgf · cm) | 4.74 | 4.83 | 4.90 |

MOTOR FOR COMPRESSOR AND HERMETIC COMPRESSOR HAVING THE SAME

TECHNICAL FIELD

The present invention relates to a motor for a compressor and a hermetic compressor having the same.

BACKGROUND ART

In general, a refrigerator or an air conditioner, as small-sized home alliances, is provided with a compressor for compressing a refrigerant. A representative motor for the compressor which drives the compressor is a well-known induction motor. The induction motor includes a stator on which a coil is wound, a rotor having conductors in the form of a squirrel cage and rotatably inserted inside of the stator, and a rotational shaft press-fitted in the center of the rotor for carrying a rotational force, generated by an interaction between a rotation magnetic field generated by an alternating current (AC) flowing in the coil of the stator and an induction current generated by the rotor, to a compression unit of the compressor.

Each of the stator and rotor is configured such that plural sheets of thin stator core are stacked together to be welded. The stator core of the stator includes a yoke portion formed in an approximately annular shape and implementing a moving path of magnetism, a plurality of tooth portions protruded from an inner circumferential surface of the yoke portion with a certain gap and having the coil wound therearound, and a slot portion recessed between the tooth portions so as to allow the coil wound around the tooth portions to be inserted therein.

The coil is widely implemented using copper (Cu) having high conductivity. The conductivity indicates how well a current flows in a material. However, it cannot be said that high conductivity always means many number of electrons flowing. The number of electrons is in proportion to a current. Accordingly, if conductivity is low but the current is the same, it can be said that the number of electrons are the same. However, with respect to the same current, the higher conductivity can decrease heat loss occurred in the material itself. A well-known material having the highest conductivity is argentums (Ag), but such Ag is expensive. Thus, copper requiring a relatively low price and having high conductivity is used for the motor for the compressor.

However, a demand of a compressor which has various functions and low price is increased as a technique for the compressor is greatly improved as well as the long history of its development. In spite of this trend, for the coil which occupies a great portion of a fabricating cost for the motor for the compressor, because it greatly influences the efficiency of the motor, a material having the high conductivity such as the copper is still used in spite of the burden of its cost.

DISCLOSURE

[Technical Solution]

In order to solve the problem of the motor for the compressor according to the related art, an object of the present invention is to provide a motor for a compressor capable of employing a material requiring lower price than copper for a coil and also maintaining a particular level of motor efficiency, and a hermetic compressor having the same.

In one aspect of the present invention, there is provided a motor for a compressor including: a stator provided with a plurality of tooth portions formed long in a radial direction, and a plurality of slot portions recessed between neighboring tooth portions; coils wound on the tooth portions and the slot portions of the stator, and wound to form end coils at both upper and lower sides thereof in an axial direction, at least some of the coils being formed of aluminum; a rotor inserted in the stator with a certain gap and having conductors rotated by an electromagnetic induction of the coils; and a rotational shaft press-fitted in the center of the rotor for transferring a rotational force to a compression unit, wherein a height H of the end coil of the coil is formed in inverse proportion to an inner diameter D of the stator, an entire area TS of the slot portions is in proportion to the inner diameter D of the stator, and a width D of the tooth portion is in inverse proportion to the inner diameter D of the stator.

In one aspect of the present invention, there is provided a hermetic compressor including: a hermetic case; a driving motor installed in the hermetic case for generating a rotational force; and a compression unit installed in the hermetic case and driven by the driving motor for compressing a refrigerant, wherein the stator of the driving motor is wound by an aluminum coil.

In a motor for a compressor and a hermetic compressor having the same according to the present invention, the use of an aluminum coil allows a drastic reduction of fabricating costs for the motor for the compressor and the hermetic compressor having the same.

Also, a ratio of a height of an end coil of a coil to an inner diameter of a stator can appropriately be designed or a ratio of an entire area of slot portions to the inner diameter of the stator can appropriately be designed, whereby an increase in noise at a low frequency band caused by a deterioration of damping effect due to the use of the aluminum coil can be prevented, resulting in preventing efficiency of the motor for the compressor and the hermetic compressor from being lowered.

In addition, by appropriately adjusting a ratio of the inner diameter of the stator to the width of the tooth portion, a decrease of driven torque of the motor for the compressor and the hermetic compressor, which may be caused due to the use of the aluminum coil, can previously be prevented.

MODE FOR INVENTION

Hereinafter, detailed description will be given of a motor for a compressor and a hermetic compressor having the same with reference to the accompanying drawings according to the present invention.

Figure 1:
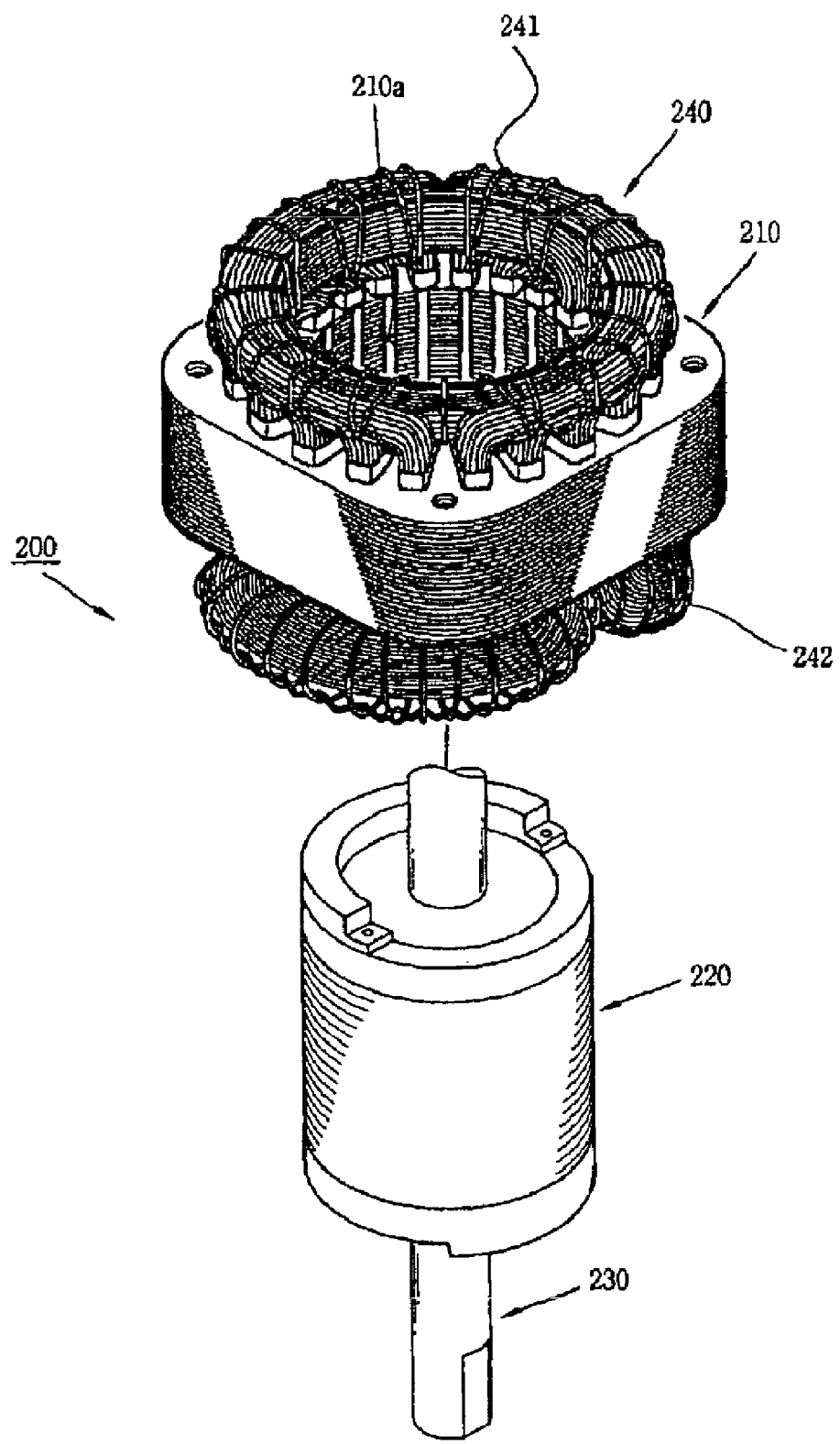
FIG. 1 is a perspective view showing a disassembled motor for a compressor according to the present invention.
Figure 2:
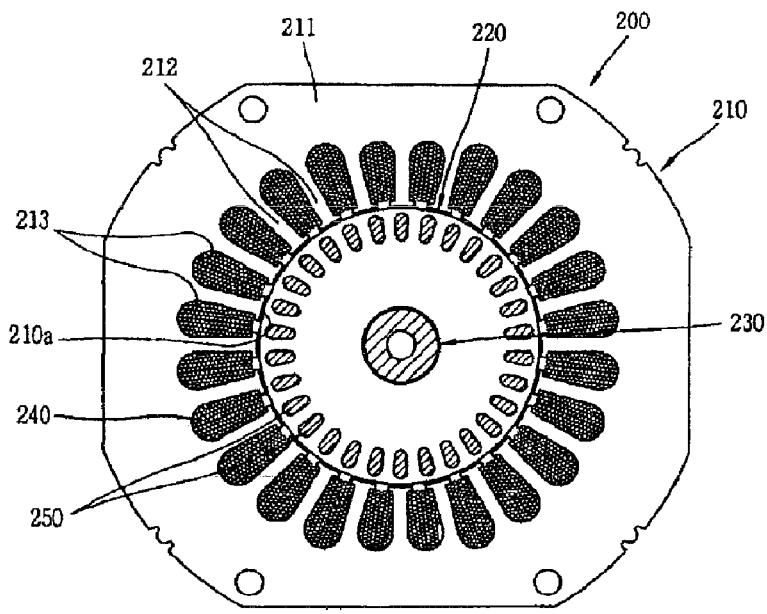
FIG. 2 is a planar view of the motor for the compressor shown in FIG. 1.

As shown in FIGS. 1 and 2, a motor 200 for a compressor according to the present invention may include a stator 210 fixed to a hermetic case of the compressor and having a coil 240 wound thereon, a rotor 220 rotatably inserted inside the stator 210 and having conductors 250 therein, and a rotational shaft 230 press-fitted in the center of the rotor 220 for transferring a rotational force to a compression unit of the compressor.

The stator 210 is formed by axially laminating plural sheets of stator core up to a certain height and welding them together. The plural sheets of stator core form a rotor insertion hole 210a having an outer circumferential surface with an approximately tetragonal shape (or it may be similar to a circular shape) and an inner circumferential surface with an approximately circular shape.

The stator core forms a yoke portion 211 configuring a moving path of magnetism with being connected in an approximately circumferential direction at its periphery. The yoke portion 211 may be integrally formed. Alternatively, the yoke portion 211 may be formed in a form of circular arc, depending on a sheet metal working for the stator core, so as to be coupled each other in a bulgy and hollow combination or be welded together. The yoke portion 211 has great influence on efficiency of the motor 200. The entire available area of the yoke portion 211 may appropriately be determined according to a decision with respect to an inner diameter of the stator 210 and an entire area of a slot portion 213 as will be explained later.

Figure 3:
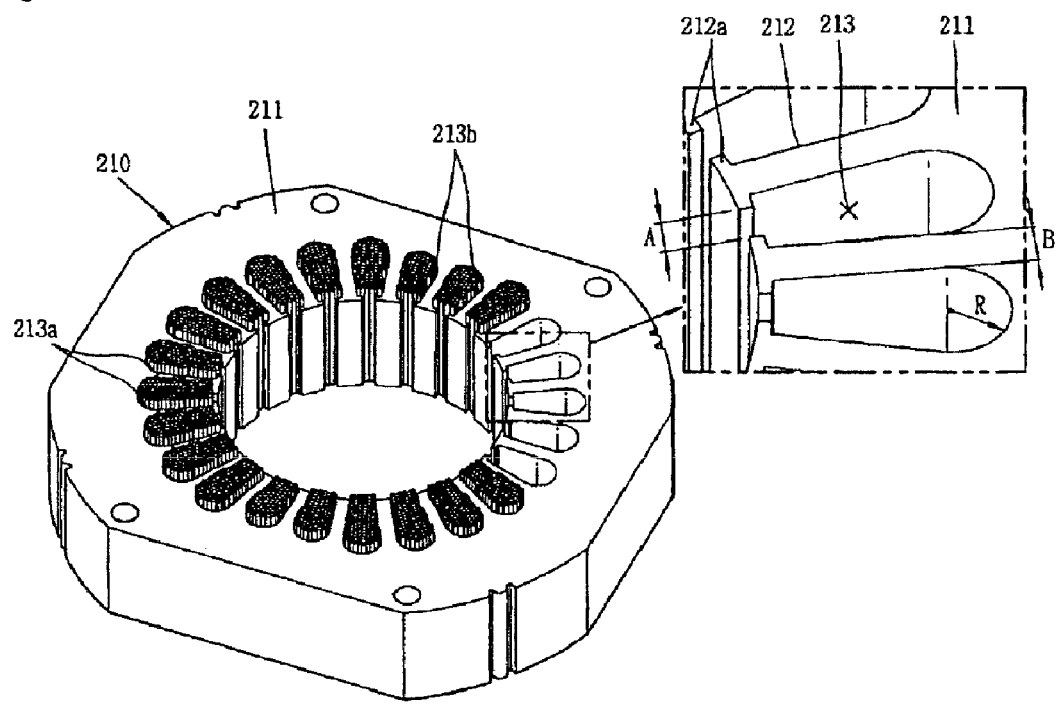
FIG. 3 is a perspective view showing a stator of the motor for the compressor shown in FIG. 1.
Figure 4:
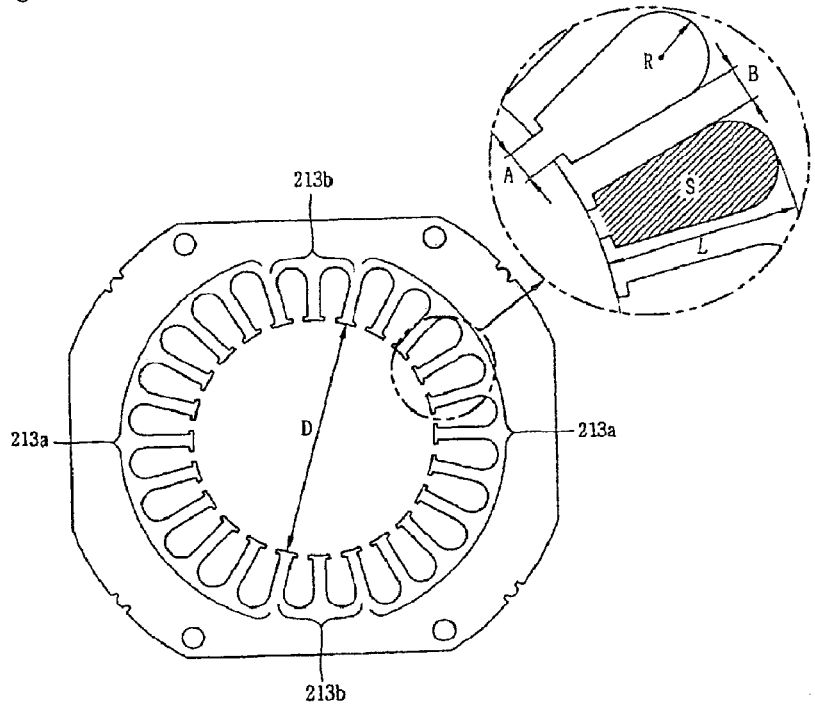
FIG. 4 is a planar view showing the stator for the compressor shown in FIG. 1.

The stator core, as shown in FIGS. 3 and 4, is provided with a plurality of tooth portions 212 formed at a central side and protruded from an inner circumferential surface of the yoke portion 211 in a radial direction with a certain gap therebetween so as to be wound by a coil. The tooth portions 212 are formed with a uniform gap with a slot portion 213 (to be explained later) interposed therebetween. The tooth portions 212 have approximately the same width B in a lengthwise direction. The width B of each tooth portion 212 is formed approximately not to be longer than a length L in its radial direction, although it depends on the capacity of the motor. Outsides of the tooth portions 212 are curvedly connected with a particular curvature R with neighboring tooth portions 212.

A ratio of the width B of each tooth portion 212 to a curvature R between neighboring tooth portions 212, namely, a ratio of the width B of the tooth portion 212 to the curvature R of the slot portion 213 to be explained later is in relation to the efficiency of the motor for the compressor. That is, the motor 200 for the compressor is configured such that the low ratio B/R of the width B of the tooth portion 212 to the curvature R of the slot portion 213 increases the efficiency of the motor. The ratio B/R is preferably approximately in the range of lower than 1.15.

Figure 5:
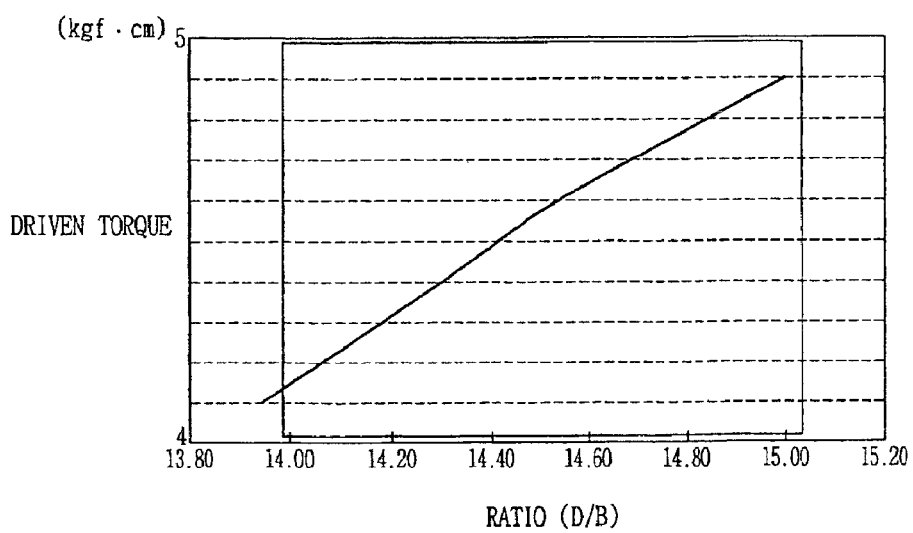
FIG. 5 is a table and a graph both showing a ratio of an inner diameter of a stator to a gap between pole portions (i.e., a gap between tooth portions) and a motor efficiency depending on the ratio in the motor for the compressor shown in FIG. 1.

A ratio D/B of the width B of each tooth portion 212 to the inner diameter D of the stator 210 also relates to efficiency of a motor for a compressor, more particularly, to a driven torque thereof. That is, for the motor 200 for the compressor, preferably, the high ratio of the inner diameter D of the stator 210 to the width B of each tooth portion 212 increases the driven torque of the motor 200, and the ratio D/B is approximately in the range of more than 13.9. For instance, as shown in FIG. 5, when the inner diameter D of the stator is 53 mm and the width B of the tooth portion is 3.80 mm (i.e., test 1), the ratio D/B of the inner diameter D of the stator to the width B of the tooth portion is 13.9 and the highest torque is 4.74 kgfcm. When the inner diameter D of the stator is 55 mm and the width B of the tooth portion is 3.80 mm (i.e., test 2), the ratio D/B of the inner diameter D of the stator to the width B of the tooth portion is 14.5 and the highest torque is 4.83 kgfcm. When the inner diameter D of the stator is 57 mm and the width B of the tooth portion is 3.80 mm (i.e., test 3), the ratio D/B of the inner diameter D of the stator to the width B of the tooth portion is 15.0 and the highest torque is 4.9 kgfcm. Hence, when the ratio of the inner diameter D of the stator to the width B of the tooth portion is high, the efficiency of the motor 200 for the compressor is increased. Here, preferably, the ratio D/B is approximately in the range of more than 13.9.

A pole portion 212a extends from an end of a central side of each tooth portion 212 in a circumferential direction to have a certain gap with neighboring tooth portions 212. The gap A between the pole portion 212a (or an area of an open side of the slot portion) should be formed not to be smaller than at least a diameter d of the coil 240, in order to facilitate a winding work of the coil 240. The gap A between the pole portions 212a (i.e., the inter-pole gap A), which has great influence on the efficiency of the motor may be differently formed according to a material of the coil 240, the diameter d of the coil 240 and the number of slots of the stator 210. For example, preferably, the inter-pole gap A should be shorter than approximately 1.73 mm for a 20-slot stator, shorter than approximately 2.10 mm for a 24-slot stator, and shorter than approximately 2.00 mm for a 28-slot stator.

The stator core is provided with slot portions 213 recessed between the tooth portions 212 with an approximately uniform interval so as to configure a space in which the coil 240 is inserted. The slot portions 213 are formed radially long based upon its planar projection. Both side surfaces thereof are formed to be widened from its central side toward its periphery, and its peripheral surface is formed to be curved outwardly.

The slot portions 213, as shown in FIGS. 3 and 4, may include a plurality of main slot portions 213a on which a main coil is wound, and a plurality of sub slot portions 213b on which a sub coil is wound. The main slot portions 213a and the sub slot portions 213b are alternately formed in a circumferential direction with a certain gap therebetween. For example, as shown in FIG. 4, the plurality of main slot portions 213a are formed in the circumferential direction, followed by the plurality of sub slot portions 213b formed with a 90° phase difference. Sequentially, the plurality of main slot portions 213a are formed with a 90° phase difference, followed by the plurality of sub slot portions 213b formed with a 90° phase difference.

A sectional area of each main slot portion 213a may be formed to be larger than that of each sub slot portion 213b. The sectional areas of the main slot portion 213a and the sub slot portion 213b may appropriately be determined depending on the number of turns of the coil with considering productivity of the motor. That is, for the main slot portion 213a, it may be preferable that a ratio N/S1 of the number of turns N to the sectional area S1 of the slot portion 213a is equal to or more than 2.18, more particularly, more than 2.20. For the sub slot portion 213b, it may be preferable that the ratio N/S2 is equal to or more than 1.85. Here, the sectional areas of the main and sub slot portions 213a and 213b may be equally applied both to a case where the main and sub slot portions 213a and 213b are all wound by an aluminum coil and to a case where the main slot portions 213a are wound by a copper coil and the sub slot portions 213b are wound by the aluminum coil.

The individual sectional area or entire sectional area and the number of the main slot portions 213a and the sub slot portions 213b can be configured to be the same to or different from each other. They can be designed by considering the efficiency from the perspective of price of a coil wound in the motor. For example, in case of using only the aluminum coil for the coil 240, the individual sectional area or entire sectional area and the number of the main slot portions 213a and the sub slot portions 213b may be extended as compared to the copper coil, but their relative ratio therebetween may be configured not to be very different from the shape of a slot portion of a typical motor. However, in case of using the aluminum coil for the main slot portion 213a and the copper coil for the sub slot portion 213b, the diameter of the aluminum coil is extended more than the diameter of the copper coil, and accordingly the individual sectional area or entire sectional area and the number of the main slot portions 213a may be relatively increased compared to those of the sub slot portions 213b. In contrast, in case of using the copper coil for the main slot portion 213a and the aluminum coil for the sub slot portions 213b, the individual sectional area or entire sectional area and the number of the sub slot portions 213b may be relatively increased compared to those of the main slot portions 213a.

The coil 240 wound on the stator 210 may be made of aluminum (having 62.7% of conductivity), which has the conductivity lower than copper (having 99.9% of conductivity) but not very lower than that, and particularly the price of the aluminum coil 240 is much cheaper than the copper.

The aluminum coil has lower conductivity than the copper, resulting in the chance of lowering the efficiency of the motor 200 for the compressor. Thus, in order to compensate this, preferably, the diameter of the aluminum coil may be about 25% thicker than the diameter of the copper coil.

For the aluminum coil, since the aluminum has lower rigidity than the copper in its material characteristic, in order to maintain the rigidity of the coil, a thickness of an enamel layer coated on an outer circumferential surface of the aluminum coil coated with an insulating material should be thicker than at least an enamel layer coated on the outer circumferential surface of the copper coil.

For the aluminum coil, since the aluminum has lower rigidity than the copper in its material characteristic, a damping effect may be deteriorated. Accordingly, noise may increase at a low frequency band. However, such problem can be solved by optimizing an inner diameter D of the stator 210 and an area S of each slot portion 213 or solved by optimizing the inner diameter D of the stator 210 and a height of a lower end coils 242.

Figure 6:
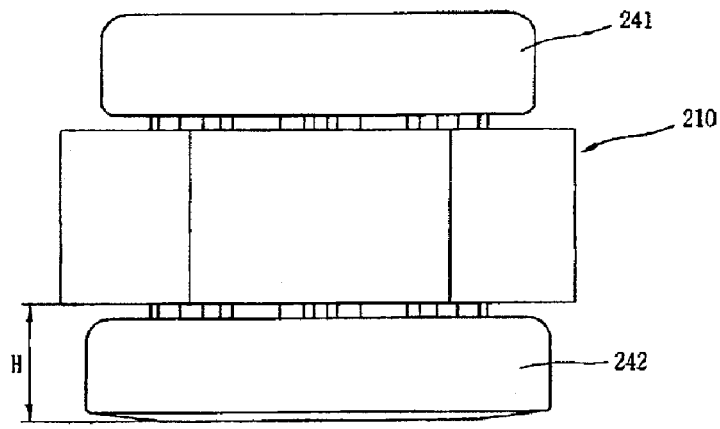
FIG. 6 is a front view showing a height of an end coil in the motor for the compressor shown in FIG. 1.
Figure 7:
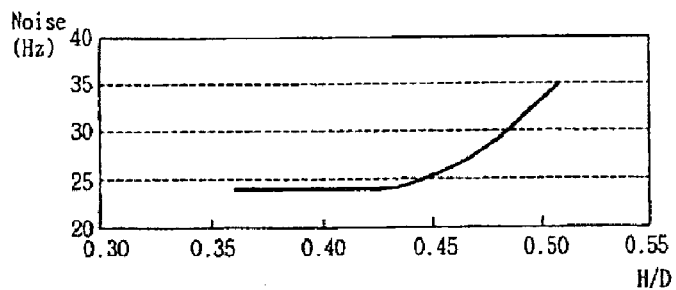
FIGS. 7 and 8 are graphs each showing the changes in noise according to a ratio of an entire area of slot portions to an inner diameter of a stator in the motor for the compressor shown in FIG. 1.
Figure 8:
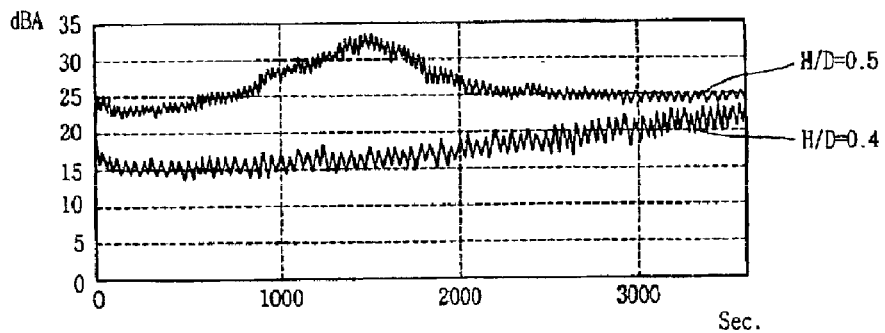
Figure 9:
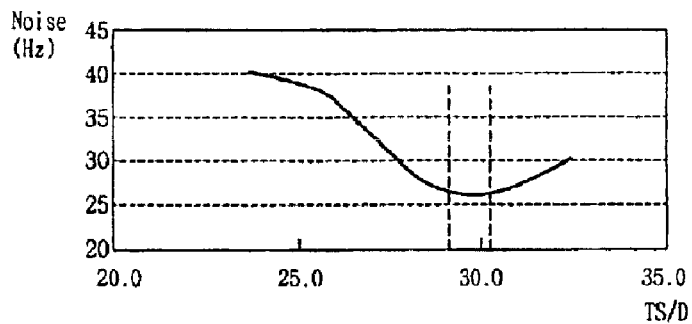
FIGS. 9 and 10 are graphs each showing the changes in noise according to a ratio of an entire area of slot portions to an inner diameter of a stator in the motor for the compressor shown in FIG. 1.
Figure 10:
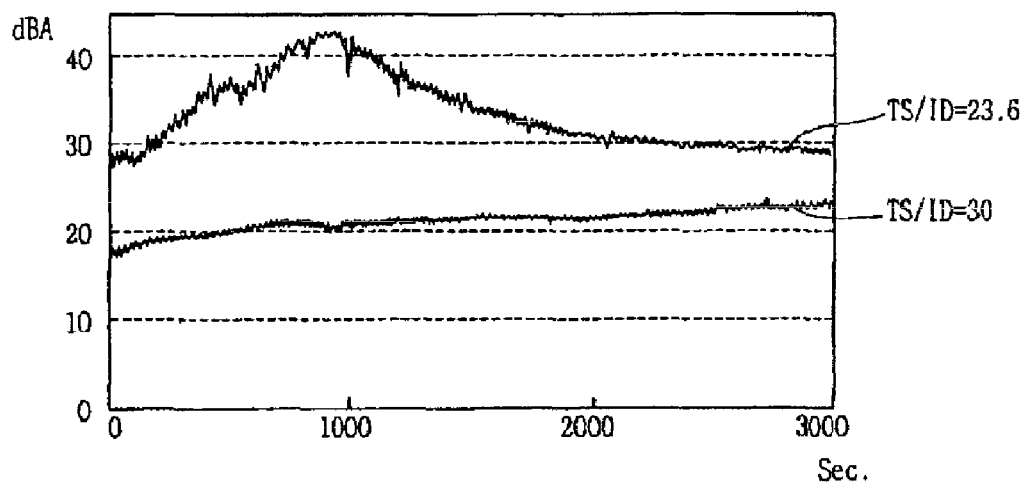

Here, as shown in FIGS. 6 and 7, in case where an inner diameter D of the stator is about 47 mm~55 mm, when the ratio of the height H of a lower end coil connected to the lower end of the stator to the inner diameter D of the stator is lower than 0.45, it can be seen that the weight of the stator is appropriately adjusted and accordingly, as shown in FIG. 8, a resonant frequency of the stator is changed, resulting in a disappearance of peak noise at a low frequency band. In addition, as shown in FIG. 9, in case where the inner diameter D of the stator is about 47 mm~55 mm, when a ratio TS/D of an entire area of the slot portions TS to the inner diameter D of the stator is in the range of about 28.5~30.5, it can be seen that the weight of the stator is appropriately adjusted and accordingly, as shown in FIG. 10, a resonant frequency of the stator is changed, resulting in a disappearance of peak noise at the low frequency band occurred when the ratio TS/D of the entire area of the slot portions TS to the inner diameter D of the stator is 23.6.

Figure 11:
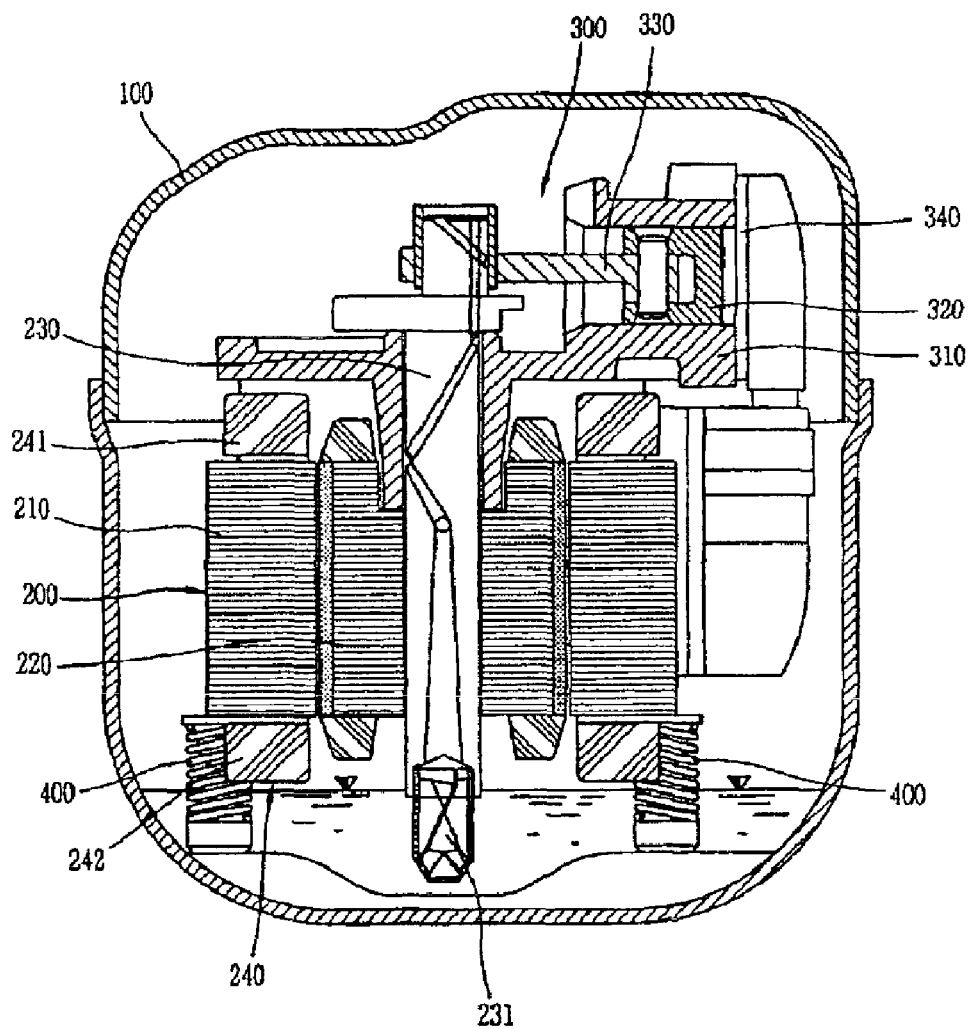
FIG. 11 is a longitudinal cross-sectional view showing a reciprocating compressor having the motor for the compressor shown in FIG. 1.

Hereinafter, a reciprocating compressor having a reciprocating motor according to the above embodiment will be described with reference to FIG. 11.

That is, the reciprocating compressor according to the present invention may include a hermetic case 100, a driving motor 200 serving as a driving source installed in the hermetic case 100, a compression unit 300 configured such that a piston 320 is connected to a rotational shaft 230 of the driving motor 200 via a connecting rod 330 to linearly reciprocate in a compression space of a cylinder block 310 having a valve assembly 340, thus to compress a refrigerant, and a supporting unit 400 installed between a bottom surface of the hermetic case 100 and a lower surface of the driving motor 200 for elastically supporting the driving motor 200 and the compression unit 300.

The driving motor 200 may be implemented as the aforesaid motor for the compressor, namely, an induction motor in which the aluminum coil is inserted in both the main and sub slot portions 213a and 213b of the stator 210 to be wound on the tooth portions 212, or the copper coil is inserted in the main slot portions 213a and the aluminum coil is inserted in the sub slot portions 213b or vice versa so as to be wound on the corresponding tooth portions 212. The driving motor 200 has the same configuration of its stator 210 as described above for the reciprocating motor, detailed description of which will thusly be omitted.

However, in the driving motor 200, when the diameter of the aluminum coil is formed longer than the copper coil in order to maintain the efficiency of the motor, the weight of the stator 210 is increased and also the heights of the upper and lower end coils 241 and 242 of the stator 210 are increased. Accordingly, an installation position of the compression unit 300 and the height of the hermetic case 100 should be raised by considering an interfere with the compression unit 300. It is also required to increase an elastic force in a longitudinal direction of the supporting unit 400 as much as the increased weight of the stator 210. To this end, it may be possible to decrease a height of a compression coil spring configuring the supporting unit 400. However, in this case, it should be considered that an oil feeder installed at a lower end of the rotational shaft 230 of the driving motor 200 should not bump against the hermetic case 100. By concerning the increase in the weight of the stator 100 and the height of the compression unit 300, the weight of an eccentric mass installed at the rotor 220 or the rotational shaft 230 should appropriately be adjusted, in order to prevent noise occurred due to a friction between the stator 210 and the rotor 220 of the driving motor 200.

In the reciprocating compressor according to the embodiment of the present invention, when power is supplied to the driving motor 200, the rotational shaft 230 rotates and the rotational force is converted into a linear reciprocating motion of the compression unit 300 by the connecting rod 330 so as to be transferred. Also, in the compression unit 300, a series of processes are repeated, namely, the piston 320 sucks a refrigerant via the valve assembly 340 while linearly reciprocating in the compression space of the cylinder block 310, so as to compress the refrigerant, and then discharges the compressed refrigerant to a refrigerating system.

Here, in the driving motor 200, when an alternating current is applied from the exterior to a main coil and a sub coil wound on the stator 210, a force is applied that the sub coil, which has a pole axis electrically prior to the main coil by 90°, is primarily rotated due to the formation of a rotation magnetic field by the current. Also, the sub coil has a current phase which is prior to the main coil due to a capacitor serially connected thereto. Accordingly, the driving motor 200 rotates at high speed. While the driving motor 200 rotates at the high speed, the rotational force is converted into a linear motion via the connecting rod 330, to be transferred to the piston 320.

As such, by employing the driving motor with the aluminum coil wound therein, a material cost of the driving motor can be reduced so as to drastically decrease a fabricating cost without a great change in the efficiency of the reciprocating compressor as compared to a motor having the copper coil wound therein. Also, the efficiency of the reciprocating compressor can be improved from the perspective of its price by appropriately designing an individual sectional area, an entire sectional area or the number of main and sub slot portions.

In addition, even when the aluminum coil having a relatively weaker damping effect than the copper coil is applied, the ratio of the height of the end coil of the aluminum coil to the inner diameter of the stator can be adjusted or a ratio of an entire area of the slop portions to the inner diameter of the stator can be adjusted, so as to reduce peak noise at a low frequency band, resulting in a reduction of noise occurred in the hermetic compressor.

Also, when a width of each tooth portion is appropriately designed with respect to the inner diameter of the stator, a driven torque can be increased thus to improve efficiency of the motor for the compressor and the hermetic compressor having the same.

The motor for the compressor according to the present invention can be applied to other compressors as well as the reciprocating compressor. However, standards for each component may be different for each compressor.

The invention claimed is:

1. A motor for a compressor comprising:
   a stator provided with a plurality of tooth portions formed long in a radial direction, and a plurality of slot portions recessed between neighboring tooth portions;
   coils wound on the tooth portions and the slot portions of the stator, and wound to form end coils at both upper and lower sides thereof in an axial direction, at least some of the coils being formed of aluminum;
   a rotor inserted in the stator with a certain gap and having conductors rotated by an electromagnetic induction of the coils; and
   a rotational shaft press-fitted in the center of the rotor for transferring a rotational force to a compression unit,
   wherein a height H of the end coil of the coil is formed in inverse proportion to an inner diameter D of the stator, an entire area TS of the slot portions is in proportion to the inner diameter D of the stator, and a width D of the tooth portion is in inverse proportion to the inner diameter D of the stator.

2. The motor of claim 1, wherein a ratio H/D of the height H of the end coil of the coil to the inner diameter D of the stator is in the range of lower than 0.45.

3. The motor of claim 1, wherein a ratio TS/D of the entire area TS of the slot portions to the inner diameter D of the stator is in the range of 28.5~30.5.

4. The motor of claim 1, wherein a ratio D/B of the inner diameter D of the stator to the width B of the tooth portion is approximately in the range of more than 13.9.

5. The motor of claim 4, wherein the inner diameter of the stator is approximately in the range between 53 mm and 57 mm, and the width of the tooth portion of the stator is approximately 3.80 mm.

6. The motor of claim 1, wherein the width of the tooth portion is formed not to be smaller than at least the diameter of the coil.

7. The motor of claim 1, wherein an outer end of the tooth portion is connected to neighboring tooth portions with a curved surface having a curvature not smaller than at least the curvature of the coil.

8. The motor of claim 1, wherein the slot portion is provided with main slot portions wound by a main coil and sub slot portions wound by a sub coil, the main and sub slot portions have different sectional areas, and several numbers of main slot portions and sub slot portions are alternately arranged.

9. The motor of claim 8, wherein the coils wound at the main slot portions and the sub slot portions are all aluminum coil.

10. The motor of claim 8, wherein at least one of the coils wound at the main slot portions and the sub slot portions is an aluminum coil, and another one is a coil having higher conductivity than the aluminum coil.

11. The motor of claim 10, wherein a coil formed of copper is wound at slot portions which are not wound by the aluminum coil.

12. The motor of claim 1, wherein the slot portion is provided with main slot portions wound by a main coil and sub slot portions wound by a sub coil, the main and sub slot portions have the same sectional area, and several numbers of main slot portions and sub slot portions are alternately arranged.

13. The motor of claim 12, wherein the coils wound at the main slot portions and the sub slot portions are all aluminum coil.

14. The motor of claim 12, wherein at least one of the coils wound at the main slot portions and the sub slot portions is an aluminum coil, and another one is a coil having higher conductivity than the aluminum coil.

15. The motor of claim 14, wherein a coil formed of copper is wound at slot portions which are not wound by the aluminum coil.

16. The motor of claim 1, wherein the slot portion is provided with main slot portions wound by a main coil and sub slot portions wound by a sub coil, the main and sub slot portions have different sectional areas, and several numbers of main slot portions and sub slot portions are alternately arranged.

17. The motor of claim 16, wherein the coils wound at the main slot portions and the sub slot portions are all aluminum coil.

18. The motor of claim 16, wherein at least one of the coils wound at the main slot portions and the sub slot portions is an aluminum coil, and another one is a coil having higher conductivity than the aluminum coil.

19. The motor of claim 18, wherein a coil formed of copper is wound at slot portions which are not wound by the aluminum coil.

20. A hermetic compressor comprising:
   a hermetic case;
   a driving motor installed in the hermetic case for generating a rotational force; and
   a compression unit installed in the hermetic case and driven by the driving motor for compressing a refrigerant,
   wherein the driving motor has a characteristic of any one of claims 1 to 19.

21. The compressor of claim 20, wherein the compression unit comprises:
   a cylinder block installed in the hermetic case for forming a compression space;
   a connecting rod having one end coupled to a rotational shaft of the driving motor for converting a rotating motion into a linear motion;
   a piston coupled to another end of the connecting rod and linearly moving in the compression space of the cylinder block so as to compress a refrigerant; and
   a valve assembly coupled to the cylinder block for controlling suction and discharge of a refrigerant.

* * * * *